United States Patent [19]

Mäkinen

[11] 4,375,989

[45] Mar. 8, 1983

[54] COATED TITANIUM DIOXIDE PIGMENT AND A PROCESS FOR THE PRODUCTION OF THE SAME

[75] Inventor: Pekka I. Mäkinen, Pori, Finland

[73] Assignee: Kemira Oy, Helsinki, Finland

[21] Appl. No.: 283,818

[22] Filed: Jul. 16, 1981

[51] Int. Cl.³ ............................................. C09C 1/36
[52] U.S. Cl. .............................. 106/300; 106/308 B; 106/308 Q; 106/309
[58] Field of Search ................. 106/299, 300, 308 B, 106/296, 308 Q, 309

[56] References Cited

U.S. PATENT DOCUMENTS

| | | | |
|---|---|---|---|
| 3,468,689 | 9/1969 | Lott, Jr. et al. | 106/300 |
| 3,522,079 | 7/1970 | Wiseman | 106/299 X |
| 3,545,994 | 12/1970 | Lott, Jr. et al. | 106/308 |
| 3,573,081 | 3/1971 | Dietz | 106/300 |

*Primary Examiner*—Carl F. Dees
*Attorney, Agent, or Firm*—Norbert P. Holler; Andrew D. Maslow

[57] ABSTRACT

The dispersability of a titanium dioxide pigment is improved by coating it with an organic coating and also an inorganic coating in a total amount of, expressed as oxide, not more than 0.5% and no less than 0.3% of the weight of the pigment. Suitable inorganic coatings are oxides and hydroxides of aluminium, zinc, titanium, zirconium and magnesium.

7 Claims, 5 Drawing Figures

- •     1,0 % $Al_2O_3$, EXAMPLE 1d
- △     0,5 % $Al_2O_3$, EXAMPLE 1c
- □     0,3 % $Al_2O_3$, EXAMPLE 1b
- ▽     0,1 % $Al_2O_3$, EXAMPLE 1a
- ●     COMPARED PIGMENT

- •    0,45 % TiO$_2$ + 0,03 % MgO , EXAMPLE 3b
- □    0,10 % TiO$_2$ + 0,03 % MgO , EXAMPLE 3a
- •    COMPARED PIGMENT

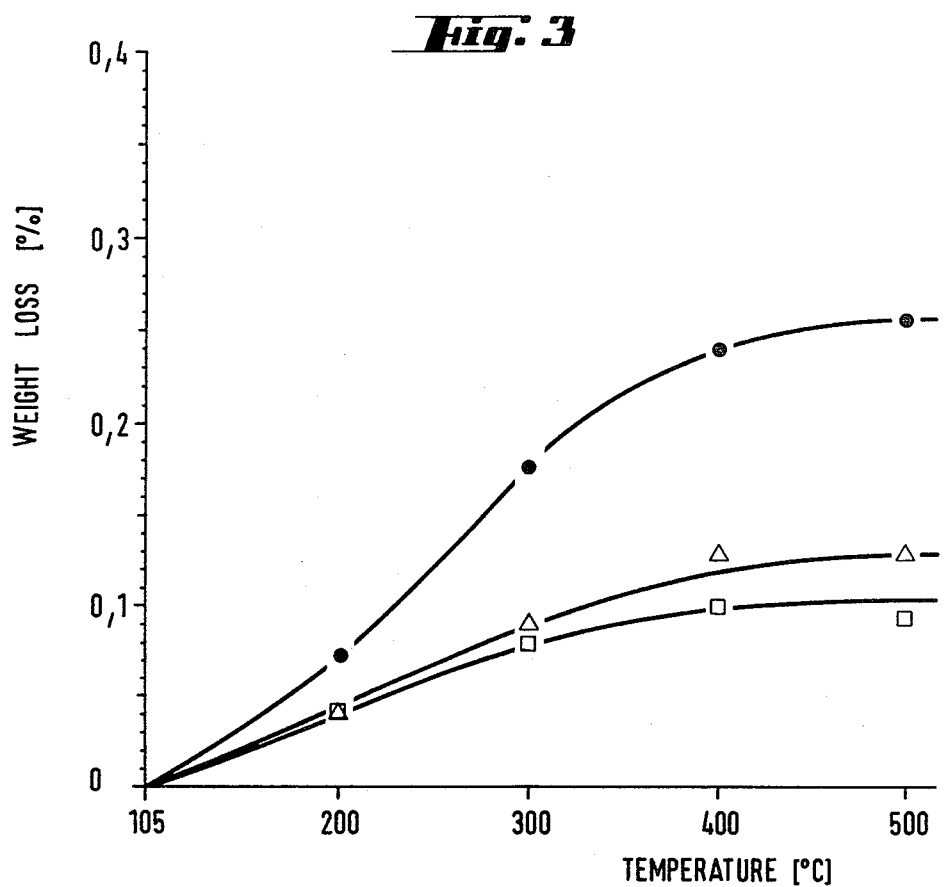

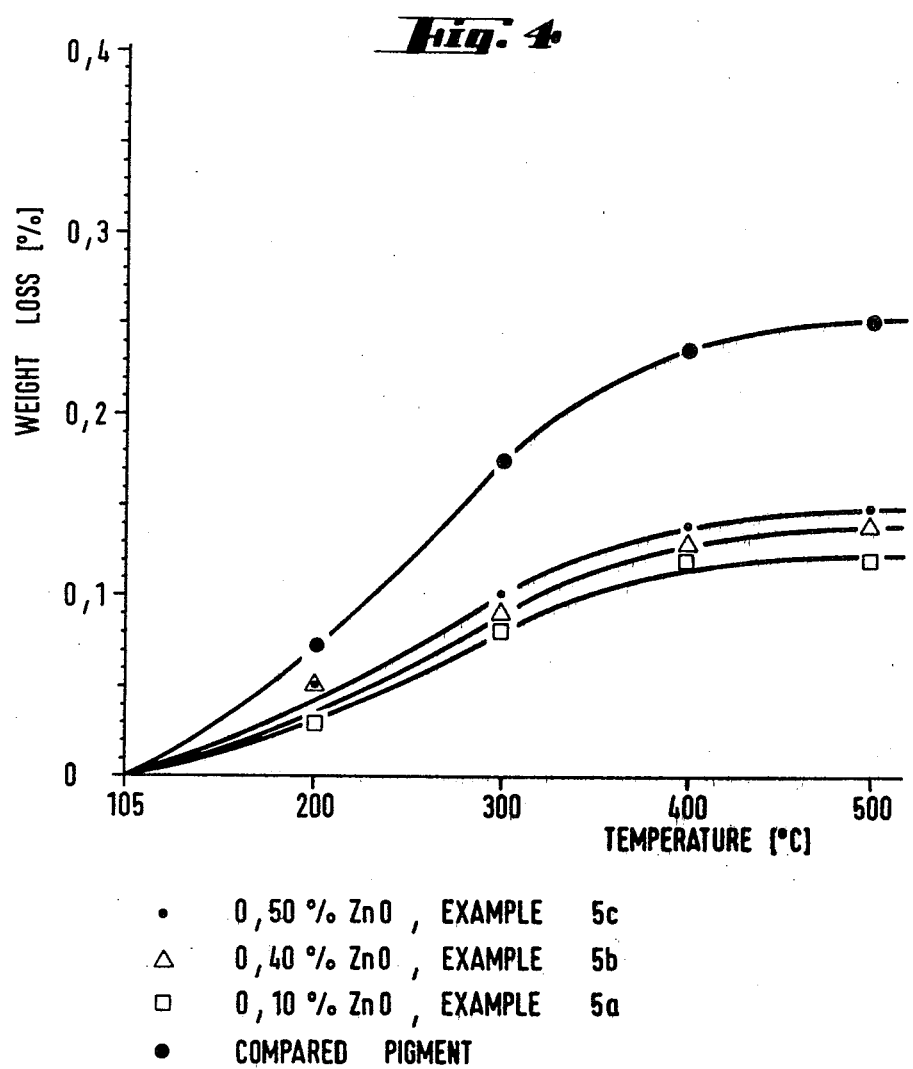

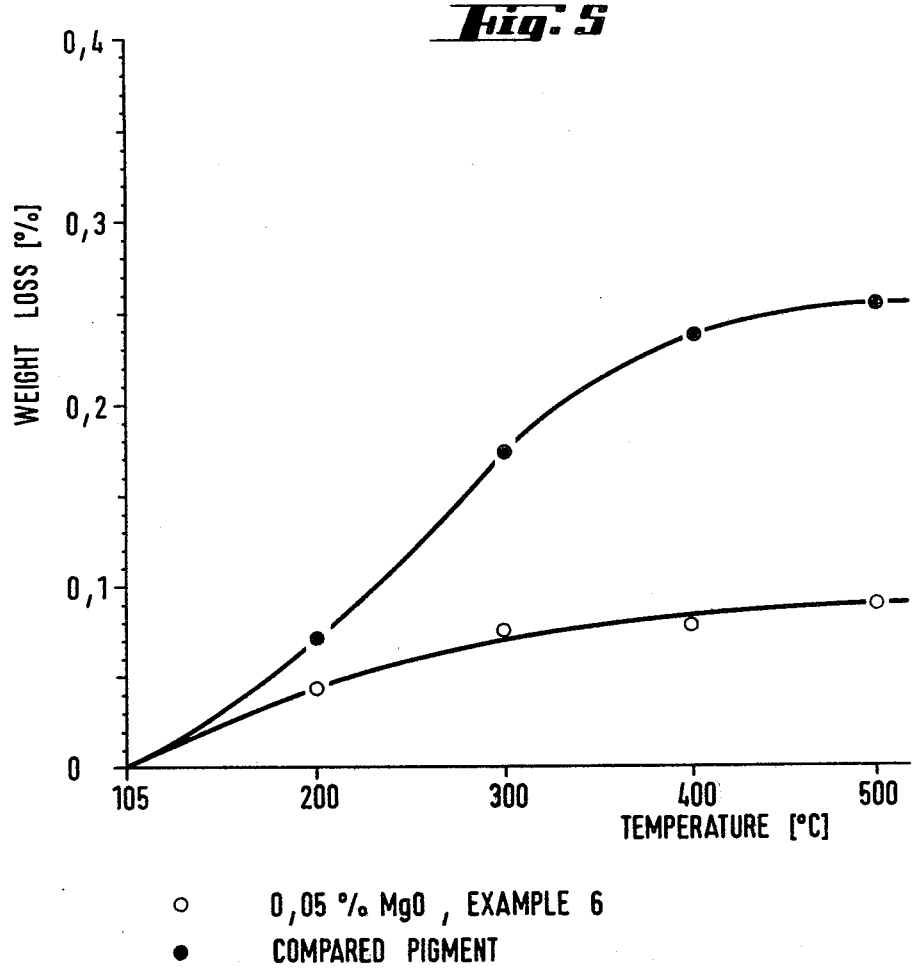

COATED TITANIUM DIOXIDE PIGMENT AND A PROCESS FOR THE PRODUCTION OF THE SAME

BACKGROUND OF THE INVENTION

The present invention relates to a titanium dioxide pigment which, in order to improve its dispersibility, is coated with an inorganic substance, and to a process for coating titanium dioxide pigment with an inorganic substance.

Titanium dioxide pigments are used in many fields, for example in the paint, plastics and rubber industries. The effectiveness of the pigment used depends to a large extent on how evenly the pigment particles can be dispersed into the product. It is generally known that the wetting dispersing properties of titanium dioxide pigments can be improved by depositing inorganic metal oxide and/or metal hydroxide coatings on the surface of titanium dioxide crystals. It is also known that, by treating titanium dioxide pigments with organic compounds, the dispersing properties of the pigments can be further improved. The use of the pigment determines the after-treatment which is most advantageous.

In extrusion coating, paper, cardboard, laminate or the like is coated with a thin pigmented plastic film. In extrusion coating, the temperature of the molten plastic is 300°–320° C. If a titanium dioxide pigment coated with an inorganic substance is used for pigmenting plastic, the water chemically bound in the inorganic coating is released at a high temperature, whereby holes are formed in the coating film (so-called lacing phenomenon). In extrusion coating, the thickness of the plastic film is 25–50 μm and its $TiO_2$ concentration is 10–15%

High requirements are set on the dispersibility of pigment, since in thin plastic films the undispersed pigment agglomerates show as spots, and unevenly dispersed pigments result in surface of irregular color. Furthermore, in most cases the optimum effect of the pigment is not utilized to the full extent. Since a very good dispersibility is required of the pigment, inorganically after-treated pigments should be used in extrusion coating, but owing to the lacing phenomenon, nowadays only titanium dioxide pigments which have not been inorganically after-treated are used in extrusion coating.

The object of the present invention is to provide a titanium dioxide pigment coated with an inorganic substance, eliminating the above-mentioned disadvantages.

SUMMARY OF THE INVENTION

According to the invention, the inorganic coating used for the after-treatment of calcinated titanium dioxide pigment is so thin that the water chemically bounds in it does not cause lacing.

The superiority of the pigment according to the invention over inorganically uncoated pigments previously used in extrusion coating lies in its better dispersibility. The rate of production can be improved by using a well dispersing pigment for the production of so-called master batches.

The pigment according to the present invention also provides the advantage that the same pigment can be used not only for extrusion coating but also for other applications in which titanium dioxide pigment is used for coloring plastics.

The inorganic metal oxide and/or metal hydroxide coating of titanium dioxide pigment produced according to the invention is very thin compared with the coatings of titanium dioxide pigment commonly used. The total amount of inorganic coating must not exceed 0.5% by weight, and an advantageous addition of coating, expressed as metal oxide, is 0.05–0.5% of the weight of the pigment. The inorganic coating of pigment produced according to the invention can be deposited on the surface of the pigment crystals during the after-treatment stage from any water-soluble metal compound commonly used for the production of titanium dioxide pigment, such as water-soluble compounds of aluminum, zinc, titanium, zirconium or magnesium, or mixtures of the same. A suitable aluminum compound is aluminum sulfate, but aluminate solutions can also be used. Zinc, magnesium and zirconium can be added in the form of sulfates, but other water-soluble compounds are also possible. Titanium can be added as titanyl sulfate or titanium tetrachloride. Inorganic coating chemicals are usually added in the form of solutions, but they can also be added as solids, as long as they are in soluble form during at least one treatment stage.

The process according to the invention can be applied to titanium dioxide pigments produced by any process. They can be produced by highly different processes, such as the sulfate process or the chloride process. The process can be applied to both rutile and anatase. When so desired, organic substances can also be used for coating titanium dioxide pigments in addition to an inorganic coating. Such substances include large-molecule fatty acids and their salts, organic silicon compounds, alcohols, polyalcohols, and amines.

The following properties of pigments produced according to the invention were determined.

1. Removal of water chemically bound in the inorganic coating of titanium dioxide pigment, at different temperatures 10 g of pigment is weighed into a tared quartz crucible which has been annealed at 600° C. The crucible with the pigment is transferred into an aging oven, in which it is kept at 105° C. for 16 h, then cooled in an exsiccator, and weighed. Thereafter the pigment is kept in the aging oven at 200°, 300°, 400° and 500° C. for 2 hours in such a manner that after each heating stage the crucible with the pigment is cooled in an exsiccator and weighed. The weight loss of the pigment at the different temperatures is calculated in percent of the dry weight obtained at 105° C.

If an organic substance has also been added to the coating of the pigment, its proportion of the weight loss need not be taken into account, if a constant amount of the same organic substance has been added to all the experimental pigments.

2. Dispersibility of the pigment in PVC plastic

The dispersibility of pigment in PVC plastic is tested by a so-called paste PVC whitening capacity test, according to the following instructions:

A PVC paste is prepared by adding 37.5 g of epoxy softener and 12.5 g of organic Sn stabilizer to 1150 g of dioctyl phthalate with the aid of a Lenart laboratory mixer (LENART mikromix, type EWTH, Paul Vollrath, Cologne). The mixture of dioctyl phthalate and stabilizer is cooled, and 2400 g of polyvinyl chloride powder is added to it. The slow rotations of the Lenart mixer are used to avoid heating up the paste.

A black toning paste is prepared by mixing 300 g of dioctyl phthalate, 300 g of polyvinyl chloride and 15 g of coal black by means of a Lenart mixer using slow rotation. The paste must not heat up during the mixing.

After an aging time of at least 24 h, the paste is passed twice through a triple-roller machine (Drais-Vollhydraulische Dreiwalzenmaschine, type DH, Grösse 3, Draiswerke GmbH, Mannheim-Waldhof).

A black PVC paste is prepared by mixing 3600 g of PVC paste and 205 g of a black toning paste by means of a Lenart mixer. The paste must not heat up during the mixing.

The dispersibility of titanium dioxide pigment in PVC paste is tested by weighing 152 g of black PVC paste, prepared as above, into a 500-ml steel decanter and by adding to it slowly 5.0 g of the titanium dioxide pigment to be tested, and by mixing it by means of a Lenart mixer (400 r/min). After the adding stage, the mixing is continued at the same rotation speed for two minutes, whereafter the speed is increased (960 r/min) and mixing is continued for one more minute. Thereafter, the paste is passed through a triple-roller machine. Plastic sheets are drawn from the pastes obtained by Lenart mixing and from the triple-rolled pastes, using as an aid a polished-edged glass pane and 0.25-mm-thick steel strips on tin-coated metal sheets attached to a magnetic table. The sheets are gelled at 175° C. for 3 min in an aging oven provided with a blower. The degree of whiteness and the tone of the plastic sheet surfaces are measured using a HUNTERLAB COLORIMETER (type D25D-3A), manufacturer HUNTERLAB, 9529 Lee High Way, Fairfax, Va. 22030) with color measuring filters X, Y and Z. the numerical value obtained with colorimeter filter Y expresses the whiteness of the sheet measured. Thus, a high Y value indicates high dispersibity. Expression YI, calculated from the values measured using filters X, Y and Z, was used as a color index which describes the color tone of the pigment.

DESCRIPTION OF THE DRAWINGS

FIG. 3 depicts the weight loss of a titanium dioxide pigment coated with a mixture of zirconium sulfate and magnesium sulfate, in percent, as a function of the temperature;

FIG. 4 depicts the weight loss of a titanium dioxide pigment coated with zinc sulfate, in percent, as a function of the temperature; and FIG. 5 depicts the weight loss of a titanium dioxide pigment coated with magnesium sulfate, in percent, as a function of the temperature.

DESCRIPTION OF THE PREFERRED EMBODIMENTS

In FIGS. 1–5, the weight loss of a titanium dioxide pigment after-treated in accordance with the invention, as a function of the temperature, is compared with the weight loss of a titanium dioxide pigment which has not been after-treated with a metal compound.

EXAMPLE 1a

A calcinated rutile titanium dioxide pigment was dry ground and dispersed in water, and the aqueous dispersion was ground in a sand grinder. The concentration of $TiO_2$ in the sand-ground pigment slurry was 200 g/l.

The pigment slurry was heated to 50° C. Acidic aluminium sulfate solution was added to the slurry in an amount corresponding to 0.1% $Al_2O_3$, calculated from the amount of $TiO_2$ in the slurry. During this addition, the pH of the slurry dropped to 2.5. The slurry was neutralized by means of a sodium carbonate solution to a pH value of 7.5. After the neutralization, the treated titanium dioxide pigment was recovered by filtration. The filter cake was washed with water from which salts had been removed by means of an ion exchanger. 0.35% dimethyl polysiloxane, calculated from the $TiO_2$, was added to the washed filter cake. The pigment was dried in an aging oven at 105° C. for 16 h and ground in a steam jet mill. An analysis of 0.10% $Al_2O_3$, calculated from the weight, was obtained from the dried and jet-ground pigment.

EXAMPLES 1b–1d

Pigments were prepared as in Example 1a, but aluminum sulfate solution was added in amounts corresponding to 0.3, 0.5 and 1.0% $Al_2O_3$, calculated from the amounts of $TiO_2$ in the slurry. 0.35% dimethyl polysiloxane, calculated from the $TiO_2$, was added to all the pigments of the example, as in Example 1a. Analyses of 0.29, 0.49 and 0.96% $Al_2O_3$, respectively, calculated from the weight of the pigment, were obtained from the dried and jet-ground pigments.

The pigments prepared in Examples 1a–1c are in accordance with the invention, whereas Example 1d, in which 1.0% $Al_2O_3$ was deposited in the coating of the pigment, is a reference example.

Figure 1:
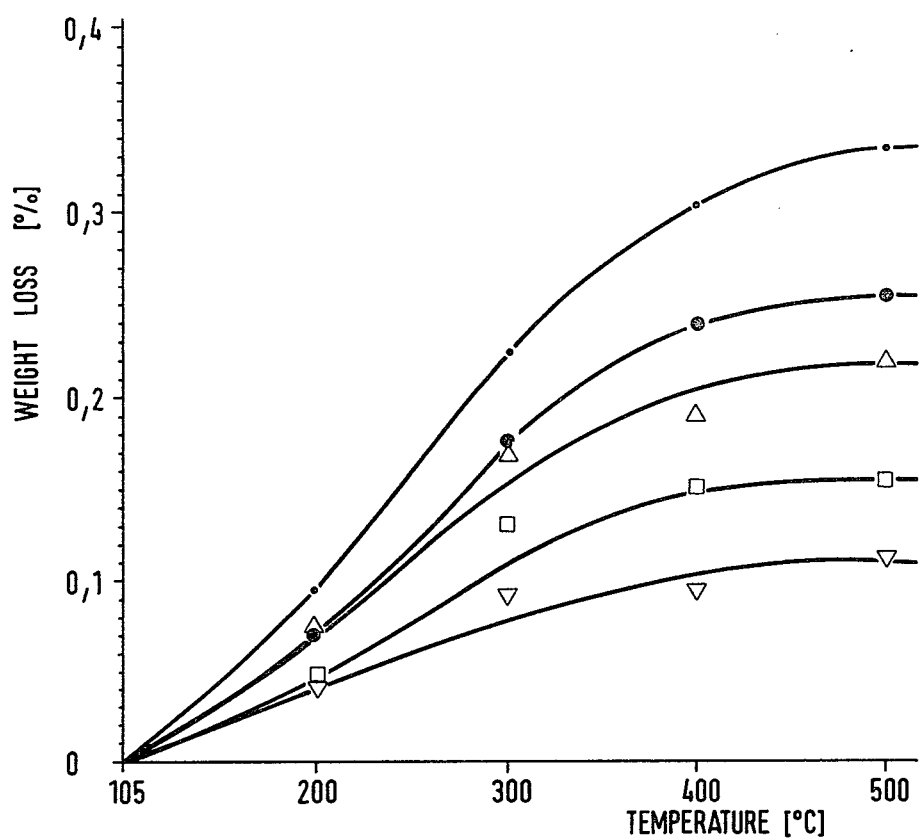
FIG. 1 depicts the weight loss of a titanium dioxide pigment coated with aluminum sulfate, in percent, as a function of the temperature.
Figure 2:
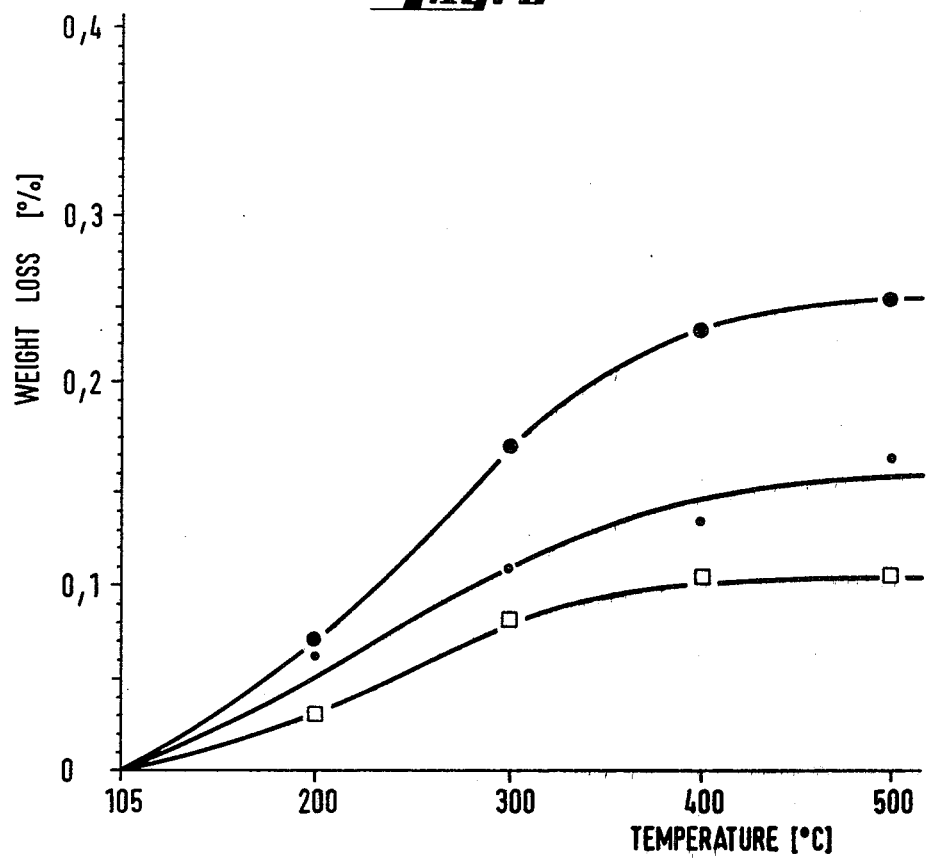
FIG. 2 depicts the weight loss of a titanium dioxide pigment coated with a mixture of titanyl sulfate and magnesium sulfate, in percent, as a function of the temperature.

The removal of the water chemically bound in the inorganic coating of the pigments prepared in Examples 1a–1d, at different temperatures, was studied gravimetrically using the above-mentioned determination method. The reference pigment used was a titanium dioxide pigment manufactured by the chloride process and not after-treated with an inorganic substance. FIG. 1 shows graphically the heat loss of the pigments prepared in Examples 1a–1d, as a function of the temperature. It can be seen from the figure that the heat loss of the inorganically after-treated pigments prepared in Examples 1a–1d, at different temperatures, is less than that of the reference pigment not coated with an inorganic pigment, when the $Al_2O_3$ coating is 0.5% or less, calculated from the weight of the pigment.

EXAMPLES 2a–2c

Pigments were prepared as in Example 1a, but aluminum sulfate solution was added in amounts corresponding to 0.25, 0.5 and 1.0% $Al_2O_3$, calculated from the $TiO_2$ amount in the slurry. 0.35% dimethyl polysiloxane, calculated from the $TiO_2$, was added to all the pigments of the example, as in Examples 1a–1d. Analyses of 0.23, 0.49 and 0.90% $Al_2O_3$, calculated from the weight of the pigment, were obtained from the dried and jet-ground pigments.

The pigments prepared in Examples 2a–2b are in accordance with the invention, whereas the pigment prepared in Example 2c, in which 1.0% $Al_2O_3$ was deposited in the coating, is a reference example.

The dispersibility of the pigments prepared in Examples 2a–2c in PVC plastic was tested using the above-mentioned dispersibility test. The reference pigment used was the same titanium dioxide pigment, not after-treated with an inorganic substance, as above. It can be observed from the results of Table 1 that the dispersibility properties of the inorganically coated pigments are considerably better than those of the reference pigment not coated with an inorganic substance.

Master batches containing pigment 50% by weight and polyethylene 50% by weight were made from pigments prepared according to Examples 2a–2c and polyethene. The reference pigment used was the above-mentioned titanium dioxide pigment not after-treated with an inorganic substance. It was observed in connection with the preparation of the master batches that the inorganically coated pigments dispersed better in plastic than did the reference pigment, and so the production capacity could be increased when using pigments prepared according to Examples 2a–2c.

Dry mixtures with a $TiO_2$ concentration of 12.5% by weight were prepared from the master batches described above and unpigmented polyethylene. Using the dry mixtures, a trial run was carried out with an extrusion coating machine; in the trial run, paper was coated with pigmented polyethylene. In the coating trial runs, the speed of the paper was 100 and 200 m/min and the amount of polyethylene coating was 10 and 20 g/m$^2$. On the basis of the results obtained in the trial runs, the pigments according to the invention, prepared as in Examples 2a–2b, are suitable for extrusion coating, but the pigment prepared according to Example 2c, in which the $Al_2O_3$ concentration in the coating is 0.90% calculated from the weight of the pigment, is not suitable for extrusion coating because of lacing. Furthermore, it was observed from the trial run results that, when the pigments according to the invention were used, a whiter final product was obtained in the extrusion coating, and the final product had fewer burls caused by pigment agglomerates than the reference pigment had. This result shows that pigments prepared in accordance with the invention disperse better in polyethene than does a reference pigment not coated inorganically. The results obtained in extrusion coating experiments regarding dispersibility and lacing agree with the results obtained in the paste PVC whitening capacity experiment and weight loss experiment.

EXAMPLES 3a–3b

Pigments were prepared as in Example 1a, but, instead of aluminum sulfate solution, titanyl sulfate was added in amounts corresponding to 0.1 and 0.45% $TiO_2$, calculated from the amount of $TiO_2$ in the slurry. Before the pigment slurry was filtered, magnesium sulfate solution was added to both pigments of the example in an amount corresponding to 0.08% MgO, calculated from the amount of $TiO_2$ in the slurry. Part of the magnesium sulfate dissolves when the filter cake is washed, and so an analysis of 0.03% MgO, calculated from the weight of the pigment, was obtained from the dried and jet-ground pigment. 0.35% dimethyl polysiloxane was added to each pigment of the example, as in Examples 1a–1d.

EXAMPLES 4a–4b

Pigments were prepared as in Examples 3a–3b, but, instead of titanyl sulfate solution, zirconium sulfate solution was added in amounts corresponding to 0.1 to 0.45% $ZrO_2$, calculated from the amount of $TiO_2$ in the slurry. Before the pigment slurry was filtered, magnesium sulfate solution was added to each pigment of the example in an amount corresponding to 0.08% MgO, calculated from the amount of $TiO_2$ in the slurry, as in Examples 3a–3b. Dimethyl polysiloxane was also added to each pigment of the example in an amount of 0.35%, calculated from the amount of $TiO_2$. Analyses of 0.03% MgO and 0.10 and 0.45% $ZrO_2$, calculated from the weight of the pigment, were obtained from the dried and jet-ground pigments.

TABLE 1

EFFECT OF $AL_2O_3$ COATING DEPOSITED DURING THE AFTER-TREATMENT STAGE ON THE DISPERSIBILITY OF TITANIUM DIOXIDE PIGMENT IN PVC PLASTIC

| | | Hunterlab measurements | | | | | | | |
|---|---|---|---|---|---|---|---|---|---|
| | $Al_2O_3$ | Lenart mixed | | | | Triple-rolled once | | | |
| Example | % | Y | X | Z | YI | Y | X | Z | YI |
| 2a | 0.23 | 23.16 | 22.40 | 31.80 | −22.14 | 23.53 | 22.75 | 32.60 | −23.44 |
| 2b | 0.49 | 23.28 | 22.51 | 32.07 | −22.60 | 23.69 | 22.90 | 32.91 | −23.87 |
| 2c | 0.90 | 23.22 | 22.45 | 32.06 | −22.99 | 23.40 | 22.63 | 32.45 | −23.62 |
| Reference pigment | | 22.28 | 21.58 | 30.18 | −19.97 | 22.48 | 21.77 | 30.60 | −20.70 |

EXAMPLES 5a–5c

Pigments were prepared as in Example 1a, but, instead of aluminum sulfate solution, zinc sulfate solution was added in amounts corresponding to 0.1, 0.4 and 0.5% ZnO, calculated from the amount of $TiO_2$ in the slurry. Dimethyl polysiloxane was added to all pigments of the example in an amount of 0.35%, calculated from the amount of $TiO_2$. Analyses of 0.10, 0.40 and 0.50 ZnO, respectively, calculated from the weight of the pigment, were obtained from the dried and jet-ground pigments.

EXAMPLE 6

Pigment was prepared as in Example 1a, but, instead of aluminum sulfate solution, magnesium sulfate solution was added in an amount corresponding to 0.2% MgO, calculated from the amount of $TiO_2$ in the slurry. Dimethyl polysiloxane was also added, in an amount of 0.35% as in Example 1a. An analysis of 0.05% MgO, calculated from the weight of the pigment, was obtained from the dried and jet-ground pigment, and thus most of the deposited MgO had been leached out when the filter cake was washed.

The pigments prepared in Examples 3–6 are all in accordance with the invention.

The removal of the water chemically bound in the inorganic coating of the pigments prepared in Examples 3–6 was studied gravimetrically at different temperatures by the determination method described above. The reference pigment used was the above-mentioned titanium dioxide pigment not inorganically after-treated. The results are shown in FIGS. 2–5. It can be seen from the figures that the weight loss of the inorganically after-treated pigments in accordance with the invention, prepared in Examples 3–6, is less at different temperatures than that of the reference pigment not inorganically coated.

The dispersibility in PVC plastic of the pigments prepared in Examples 3–6 and Example 1a—all of which are in accordance with the invention—was tested using the above-mentioned dispersibility test. The reference pigment used was titanium dioxide pigment not inorganically after-treated, but a different batch than in the dispersibility test illustrated in Table 1. It can be seen from the results shown in Table 2 that the dispersibility properties of all the inorganically coated pigments prepared in accordance with the invention in Examples 3–6 and Example 1a are considerably better than those of the reference pigment not inorganically coated.

total amount being expressed as $Al_2O_3$, ZnO, $TiO_2$, $ZrO_2$ and MgO, respectively.

4. A process for coating a titanium dioxide pigment to improve its dispersability comprising adding to an aqueous slurry of calcinated titanium dioxide pigment an inorganic water-soluble compound or an inorganic compound which can be brought to a water-soluble form in the slurry, the inorganic compound being added to the titanium dioxide pigment slurry in an amount which, expressed as an oxide, is about 0.05–0.5% of the weight of the titanium dioxide pigment; and by depositing it on the titanium dioxide pigment, and further comprising adding to said pigment slurry an organic substance selected from the group comprising large-molecule fatty acids and their salts; organic silicon com-

TABLE 2
EFFECT OF INORGANIC COATING DEPOSITED DURING THE AFTER-TREATMENT STAGE ON THE DISPERSIBILITY OF TITANIUM DIOXIDE PIGMENT IN PVC PLASTIC

| | | | | | | Hunterlab measurements | | | | | | | |
|---|---|---|---|---|---|---|---|---|---|---|---|---|---|
| | $Al_2O_3$ | $TiO_2$ | $ZrO_2$ | ZnO | MgO | Lenart mixed | | | | Triple-rolled once | | | |
| Example | % | % | % | % | % | Y | X | Z | YI | Y | X | Z | YI |
| 1a | 0.10 | | | | | 22.59 | 21.90 | 30.80 | −20.81 | 23.60 | 22.88 | 32.35 | −21.52 |
| 3a | | 0.10 | | | 0.03 | 22.45 | 21.78 | 30.71 | −21.24 | 23.60 | 22.88 | 32.48 | −22.16 |
| 3b | | 0.45 | | | 0.03 | 22.47 | 21.80 | 30.79 | −21.47 | 23.76 | 23.03 | 32.72 | −22.27 |
| 4a | | | 0.10 | | 0.03 | 22.19 | 21.58 | 30.99 | −23.91 | 23.34 | 22.69 | 32.74 | −24.63 |
| 4b | | | 0.45 | | 0.03 | 22.22 | 21.60 | 31.04 | −24.04 | 23.24 | 22.60 | 32.67 | −24.90 |
| 5a | | | | 0.10 | | 22.44 | 21.76 | 30.58 | −20.74 | 23.67 | 22.95 | 32.43 | −21.53 |
| 5b | | | | 0.40 | | 22.54 | 21.85 | 30.71 | −20.74 | 23.86 | 23.14 | 32.66 | −21.30 |
| 5c | | | | 0.50 | | 22.47 | 21.78 | 30.60 | −20.67 | 23.55 | 22.84 | 32.23 | −21.33 |
| 6 | | | | | 0.05 | 22.28 | 21.66 | 30.93 | −23.13 | 23.35 | 22.69 | 32.60 | −23.98 |
| Reference pigment | | | | | | 21.21 | 20.59 | 28.87 | −20.43 | 22.19 | 21.54 | 30.53 | −21.96 |

What is claimed is:

1. A titanium dioxide pigment, comprising a coating of an inorganic substance, the total amount of the inorganic coating, expressed as oxide, being at maximum about 0.5% of the weight of the pigment and further comprising a coating of an organic substance selected from the group comprising large-molecule fatty acids and their salts; organic silicon compounds, such as dimethyl polysiloxane; alcohols and polyalcohols.

2. A titanium oxide pigment of claim 1, comprising at least 0.03% of the inorganic compound calculated on the weight of the pigment.

3. A titanium dioxide pigment according to claim 1 or 2, in which the inorganic coating is an oxide or hydroxide of at least one element selected from the group of aluminum, zinc, titanium, zirconium and magnesium, its pounds, such as dimethyl polysiloxane; alcohols and polyalcohols.

5. A process according to claim 4, in which a compound selected from the group comprising aluminium, zinc, titanium, zirconium and magnesium; and an aqueous solution of such a compound, is added to the titanium dioxide pigment slurry.

6. A process according to claim 5, in which aluminium sulfate, expressed as $Al_2O_3$, is added to the pigment slurry in an amount of 0.1–0.5% of the weight of the pigment.

7. A process according to claim 5, in which titanyl sulfate or titanium tetrachloride, expressed as $TiO_2$, is added to the pigment slurry in an amount of 0.1–0.45% of the weight of the pigment.

* * * * *